United States Patent Office 3,155,956
Patented Nov. 3, 1964

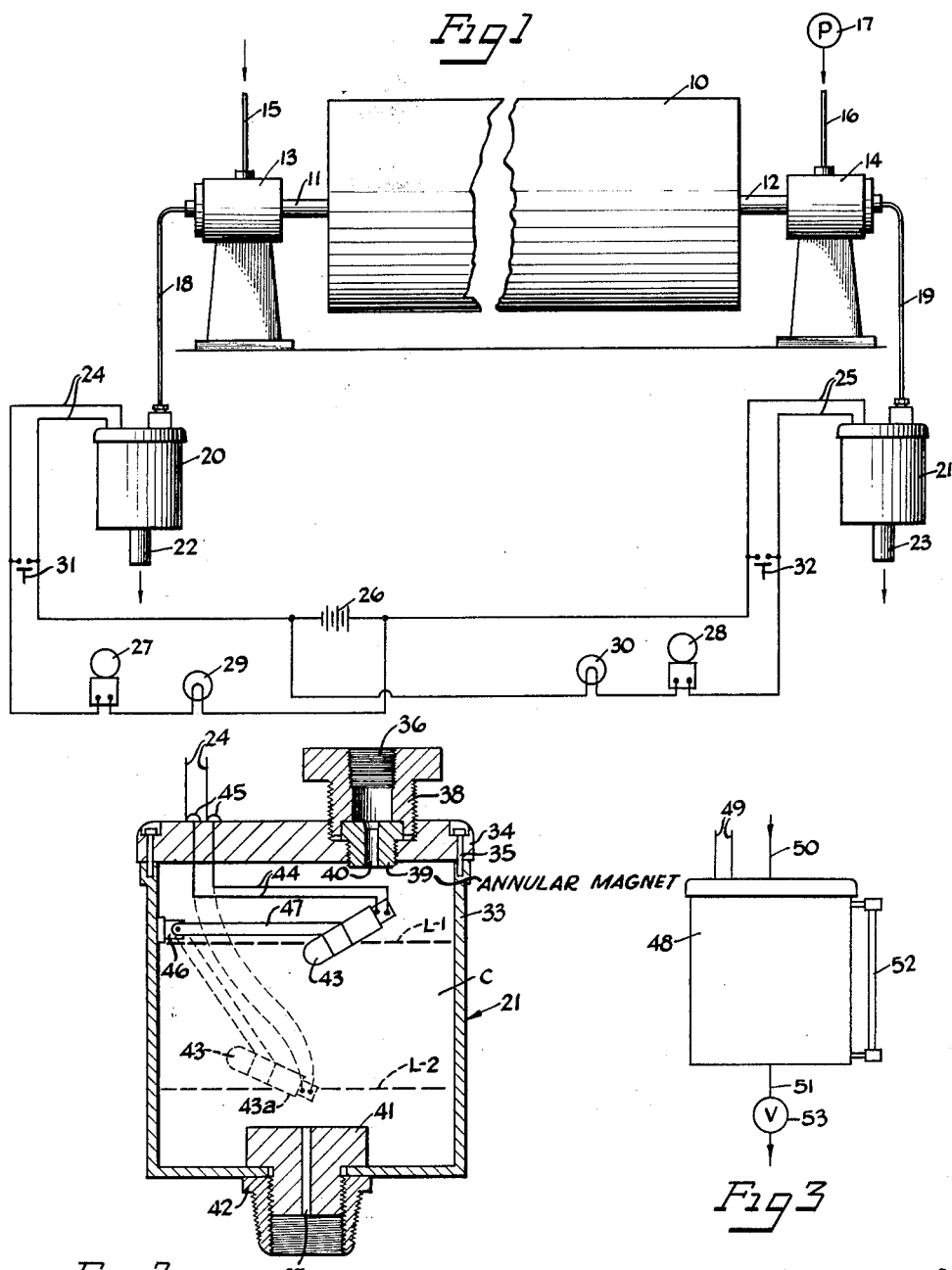

3,155,956
BEARING FAILURE PREDICTING DEVICE
Lloyd Hornbostel, Jr., and Lawrence B. Ward, Beloit, Wis., assignors to Beloit Corporation, Beloit, Wis., a corporation of Wisconsin
Filed Feb. 15, 1963, Ser. No. 258,829
8 Claims. (Cl. 340—269)

The present invention relates to an improved mechanism for detecting approaching bearing failure.

In continually operating machines it is essential that bearing failures be detected as soon as possible. Detection of approaching bearing failure permits shut-down of the machine and repair or replacement of the bearing before major damage has occurred. Early detection will prevent damage to associated elements and will prevent major damage to the bearing and will prevent particles of metal released from the bearing from being carried to the lubricating system.

An object of the present invention is to provide an improved bearing failure detection device which utilizes in a unique manner the particles of tramp metal which are released from the bearing prior to its failure.

Another object of the invention is to provide an improved bearing detection device which is capable of operating an elecrical signal circuit but which can be safely used in explosive atmospheres or other hazardous or adverse conditions and wherein the operating parts are completely enclosed and protected so as not to be subjected to damage from liquid or other materials and which can operate safely in substantially any environment.

A further object of the invention is to provide an improved bearing failure detection device which captures metal particles released by the bearing utilizing these particles for operation of the device and also preventing the particles from continuing on through the lubricating system.

A still further object of the invention is to provide an improved bearing failure detection device capable of adaptation to substantially any bearing assembly having a flow of lubricant.

A still further object of the invention is to provide a bearing failure detection device for operating an electrical circuit which has special application in areas where a spark or an arc is objectionable.

A feature of the invention is the provision of a failure detection device having a flow chamber with an outlet opening and an inlet opening for receiving a flow of lubricant from the bearing with the outlet opening of a smaller size than the inlet opening so as to maintain a constant high operating level of fluid in the chamber. A magnetic annulus forms an orifice in the inlet opening to collect particles of tramp metal on the inner surface of the annulus and restrict the orifice with approaching bearing failure to thereby restrict the flow of lubricant into the chamber causing the level to drop and a pivotally supported mercury switch sealed within the chamber operates a circuit with the lowering of lubricant level.

Other objects, advantages and features will become more fully apparent with the teaching of the principles of the invention in connection with the disclosure of the preferred embodiments thereof in the specification, claims and drawings, in which:

FIGURE 1 is an elevational view shown partly in schematic form of a mechanism with a bearing assembly and bearing detection device constructed and operating in accordance with the principles of the present invention;

FIGURE 2 is an enlarged detailed vertical sectional view taken through the housing of the bearing detection device; and FIGURE 3 is a schematic view showing modified arrangement of the detection device of the invention.

On the drawings:

As shown in FIGURE 1, a machine rotor 10 such as a dryer cylinder or drum of a paper machine is supported on shafts 11 and 12 journalled in bearings 13 and 14. The bearings are supplied with a continuous flow of lubricant through lubricant supply lines 15 and 16 which are provided with lubricant such as by a pump illustrated at 17 for the line 16. Various lubricating arrangements may be employed to provide a continuous supply of lubricant and preferably the lubricant discharges from the bearings are to separate lines so that separate bearing failure detection devices may be used to readily locate which of the bearings is approaching failure. The lubricant after flowing through the bearings flows into lines 18 and 19 which respectively connect to housing 20 and 21 for individual bearing failure detectors.

Thus each of the bearings 13 and 14 has a lubricant passage with the lines 16 and 19 providing the passage for the bearing 14 and the housing connected downstream of the bearing in the passage. The lubricant discharges from the housing through a line 23 which leads back to the lubricating system for a continual flow of lubricant to the bearings.

Each of the housings 20 and 21 have mechanism for closing a circuit to manifest approaching bearing failure with the circuit connecting to leads 24 and 25. An electrical source 26 is provided for the circuit and audible alarms or horns 27 and 28 are in the circuit as well as visible signals or lights 29 and 30. These are operated by closure of the switches within the housings 20 and 21 in the individual circuits. Test switches 31 and 32 are provided for manually closing the circuits to test operation of the audible and visible signals. As will be appreciated, these circuits may be additionally connected to automatic operators for shutting down the machine or modifying its operation preparatory to repairing the failing bearing. Also, the circuits may be arranged so that upon operation of the signals an "acknowledge" switch may be closed to shut off the horns 27 or 28 leaving on the lights 29 or 30. The system is then reset after the bearing is repaired for continued operation.

FIGURE 2 illustrates the housing in detail and inasmuch as housings 20 and 21 are of the same construction only the housing 21 need be shown. The housing provides a hollow chamber C therein for the lubricant which is maintained at a high level L–1 during normal operation, and which drops to a lower level L–2 with approaching bearing failure. The housing is shown as being cylindrical in shape with an open top to receive a cover 34 clamped in place by screws 35 and sealed with appropriate gaskets so as to prevent leakage.

The chamber C is provided with an inlet opening 36 and an outlet opening 37 for the flow of lubricant therethrough. The inlet opening is provided through a fitting 38 threaded into a suitably tapped opening in the cover 34. The fitting 38 clamps a small annulus or orifice member 39 in place providing an inlet orifice 40 which is critically sized relative to the size of the outlet opening 37. The outlet opening 37 is provided by an outlet member 41 held in place on the housing by a threaded fitting 42, with the fittings 38 and 42 suitable for the connection of lubricant lines.

The orifice member 39 is of magnetic material such as Alnico V. Preferably the parts of the housing are of a non-magnetic material such as brass or plastic.

As the bearing approaches failure, particles of tramp metal will be released from the bearing surfaces into the lubricant line and these particles will be collected on the inner surface of the orifice member 39 to reduce the flow area thereby causing the level of lubricant in the chamber C to drop. When the level reaches L–2 a switch is actuated.

To detect the level of the liquid within the chamber C a float 43 is mounted within the chamber supported on an arm 47 pivotally mounted on a bracket 46 on the chamber wall. The float carries a switch 43a, and in a preferred arrangement a mercury switch acts as the float and switch and is mounted on the arm 47 so that the contacts are broken at the upper solid line position of FIGURE 2, and are closed at the lower dotted line position of FIGURE 2. Leads 44 connect to the mercury switch and lead sealingly through the cover 34 to connect to terminals 45 provided for connection to the leads 24 of the circuit. The mercury switch arrangement provides a convenient reliable and inexpensive arrangement wherein the operating parts are sealed within the chamber and the switch contacts are sealed within the mercury switch bulb for safe operation in areas where a spark would be objectionable. Also the parts are substantially corrosion-free, being protected by the housing and can be used in a system where corrosive gases or liquids are present since the operating parts are protected. Also excessive temperatures will not adversely affect the operating mechanism since it will operate at substantially the temperature of the lubricating fluid.

The mechanism can be quickly adapted for operation in a system of a given flow by selection of the size of the outlet opening member 41 and the inlet orifice 39. Preferably the inlet orifice 39 is sufficiently larger in area than the outlet opening 37 so that the liquid lubricant will remain at the level L-1 during normal operation but as soon as particles begin collecting on the inner wall of the orifice member 39, flow will be diminished to cause the level of the liquid lubricant to recede.

FIGURE 3 illustrates an arrangement wherein the outlet opening is changed without requiring change of fittings and wherein minor adjustment can be made of the outlet opening to control the normal operating level. A housing 48 is provided with a chamber therein, not shown, similar to the chamber of FIGURE 2 and a float within the chamber has a switch connecting to electrical leads 49. Lubricant flows into the chamber through an inlet 50 and out of the chamber through an outlet 51. A sight glass 52 connects to the chamber to indicate the level of lubricating liquid therein. A flow restricting valve 53 is connected in the outlet line 51 so that the flow of liquid from the chamber can be regulated to bring the liquid to a suitable level within the chamber. An inlet orifice will still be provided which must be related to the size of the outlet so that the collection of particles will reduce flow to cause the lubricant level to drop.

While the preferred arrangement is illustrated, it is also contemplated that the system may be used with a magnetic orifice in the outlet from the chamber C. The outlet opening would then be larger than the inlet opening so as to maintain the chamber C free from lubricant during normal operation. As soon as particles would begin to gather on the inner surface of the orifice, flow from the chamber would be restricted so that the level of lubricant would increase. A float switch within the chamber would then be operated when the liquid level rose to a predetermined height.

It is also contemplated that the arrangement of FIGURE 2, the structure of FIGURE 3, or the above described modification may be used in a parallel flow system with a divider valve so that only a portion of the lubricant from the bearing is directed to the detector housing. The divider valve would then be regulated until the desired rate of flow of lubricant flows to the housing. In the arrangement shown in FIGURE 2 flow would be increased to the housing until the liquid reached the level L-1 and the remaining flow would pass through the lubricant system bypassing the housing 21. Some of the tramp metal particles in that system would of course not be caught by the magnetic orifice member 39.

In summary, in the arrangement illustrated in FIGURES 1 and 2, lubricant flows at a constant rate through the chamber C with the lubricant level remaining at L-1 during normal operation. When particles of tramp metal are released by the bearing as it approaches failure, these particles build up on the inner surface of the magnetic orifice member 39 to restrict flow into the chamber C so that its level drops and the float switch 43 swings down to the dotted line position to close the alarm circuit.

Thus it will be seen that we have provided an improved reliable bearing failure detection device well suited for use in systems wherein a spark or arc would be objectionable. The mechanism provides the advantages and features hereinabove set forth and is capable of reliable safe operating life without adjustment or attention.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

We claim as our invention:

1. A device for detecting failure of a bearing in a bearing assembly having a substantially uniform flow of lubricant comprising,
   means defining a chamber with an outlet opening and an inlet opening for receiving a flow of lubricant from said bearing,
      said openings being relatively sized for maintaining a substantially constant level of lubricant in the chamber under normal operating conditions,
   an orifice in one of said openings restrictable by tramp metal released by the bearing prior to failure and changing flow through said one opening,
   magnetic means operatively associated with said orifice for collecting tramp metal in the orifice released by the bearing prior to failure and reducing the orifice size thereby reducing flow through said orifice,
   and means detecting change in lubricant level in said chamber for indicating approaching bearing failure.

2. A device for detecting failure of a bearing in a bearing assembly having a substantially uniform flow of lubricant comprising,
   means defining a chamber with an outlet opening and an inlet opening for receiving a flow of lubricant from said bearing,
      said openings being relatively sized for maintaining a substantially constant level of lubricant in the chamber under normal operating conditions,
   magnetic means positioned at one of said openings for collecting tramp metal in the opening released by the bearing prior to failure and changing flow through said one opening,
   and means detecting change in lubricant level in said chamber for indicating approaching bearing failure.

3. A device for detecting failure of a bearing in a bearing assembly having a substantially uniform flow of lubricant comprising,
   means defining a chamber with an outlet opening and an inlet opening for receiving a flow of lubricant from said bearing,
      said inlet opening being sized relative to the outlet opening for maintaining a substantially constant level of lubricant in the chamber under normal operating conditions,
   magnetic means at said inlet opening collecting particles of tramp metal in the opening released by the bearing prior to failure and reducing the size of the inlet opening reducing flow into the chamber,
   and means detecting change in lubricant level in said chamber for indicating approaching bearing failure.

4. A device for detecting failure of a bearing in a bearing assembly having a substantially uniform flow of lubricant comprising,
   means defining a chamber with an outlet opening and an inlet opening for receiving a flow of lubricant from said bearing,
said openings being relatively sized for maintaining a substantially constant level of lubricant in the chamber under normal operating conditions,
magnetic means positioned at one of said openings for collecting tramp metal in the opening released by the bearing prior to failure and changing flow through said one opening,
a float within said chamber,
and means connected to said float for manifesting change in level of the float with change in level of the lubricant within the chamber.

5. A device for detecting failure of a bearing in a bearing assembly having a substantially uniform flow of lubricant comprising,
means defining a chamber with an outlet opening and an inlet opening for receiving a flow of lubricant from said bearing,
said openings being relatively sized for maintaining a substantially constant level of lubricant in the chamber under normal operating conditions,
magnetic means positioned at one of said openings for collecting tramp metal in the opening released by the bearing prior to failure and changing flow through said one opening,
a float within said chamber,
and a switch connected to the float and located within the chamber for being operated with change in lubricant level within the chamber.

6. A device for detecting failure of a bearing in a bearing assembly having a substantially uniform flow of lubricant comprising,
a housing having a flow chamber with an outlet opening and an inlet opening for receiving a flow of lubricant from the bearing,
said openings being relatively sized for maintaining a substantially constant level of lubricant in the chamber under normal operating conditions,
magnetic means in one of said openings collecting particles of tramp metal released by the bearing prior to failure and reducing the size of the opening for changing the level of lubricant within the chamber,
a mercury switch within the chamber,
and a pivotal mount for said switch supporting the swtich so that the switch will be operated with change in level of lubricant within the chamber.

7. A device for detecting failure of a bearing in a bearing assembly having a substantially uniform flow of lubricant comprising,
a housing having a chamber with an outlet opening and an inlet opening for receiving a flow of lubricant from the bearing,
means for controlling the rate of flow from said outlet opening to maintain the lubricant at a first level within the chamber under normal operating conditions,
magnetic means at said inlet opening collecting particles of tramp metal in the opening released by the bearing prior to failure and reducing the size of the inlet opening reducing flow into the chamber,
said lubricant dropping to a second lower level with restriction of the inlet opening,
and means detecting change of level of lubricant within the chamber from said first level to said second level.

8. A bearing assembly comprising in combination,
a bearing having a journal house therein,
a lubricant flow passage for directing a flow of lubricant to the bearing,
means supplying lubricant to the passage at a substantially uniform rate,
a housing having a closed chamber therein with an outlet opening and an inlet opening connected to said passage downstream of the bearing for receiving lubricant therefrom,
said housing being formed of a non-magnetic material,
an orifice in said inlet opening sized relative to the outlet opening for maintaining the lubricant at a first high level within the chamber under normal operating conditions,
an annular magnet surrounding said orifice for collecting particle sof tramp metal released by the bearing prior to failure against the inner walls of said orifice for restricting the orifice size to decrease the flow of lubricant in the chamber,
said lubricant dropping to a lower second level within the chamber with decrease in size of said orifice,
a mercury switch within said chamber,
a pivotal support for said mercury switch supporting the switch with the switch circuit open as the switch is in a first position at the first level of lubricant in the chamber and with the switch contacts closed when the switch is at a second position at the second level of lubricant within the chamber,
electrical leads connected to the switch and sealingly extending through the housing from the chamber,
a signal circuit connected to said leads to be operated by the switch,
and an alarm connected to said signal circuit for manifesting approaching bearing failure by operation through closure of said switch.

References Cited in the file of this patent
UNITED STATES PATENTS

| | | |
|---|---|---|
| 2,328,131 | Eisler | Aug. 31, 1943 |
| 2,638,581 | Marvel | May 12, 1953 |
| 2,757,801 | Muggli et al. | Aug. 7, 1956 |